United States Patent [19]
Lemond et al.

[11] 3,874,340
[45] Apr. 1, 1975

[54] AQUARIUM TANK FEED SYSTEM

[76] Inventors: Robert H. Lemond, R.R. No. 1, Box 190; Donald E. Lemond, R.R. No. 1, Box 8, both of Ellsworth, Mich. 49729

[22] Filed: Oct. 19, 1973

[21] Appl. No.: 407,873

[52] U.S. Cl. .............................................. 119/51 R
[51] Int. Cl. ........................................A01k 61/02
[58] Field of Search ............... 119/51 R, 5, 3; 46/92 272/8

[56] References Cited
UNITED STATES PATENTS
3,265,388  8/1966  Kane .................................. 119/5 X
3,741,163  6/1973  Bush ..................................... 119/3

*Primary Examiner*—Hugh R. Chamblee
*Attorney, Agent, or Firm*—Cullen, Settle, Sloman & Cantor

[57] ABSTRACT

An automatic feed system for aquarium tanks having an aerating pump means for bubbling air into the water in the tank, formed of an underwater actuator connected to and operating an above water feed hopper. The actuator consists of a dome-like inverted container hinged to a horizontal support plate so that the container can swing upwardly away from the plate. An air diversion tube diverts some air bubbles from the pump means into the container, at a controlled rate, so that upon sufficient accumulation of air within the container, the container swings up, wherein the air escapes and is displaced by water so that the container swings down again, with the cycle being repeated. A movable closure covers the hopper feed opening and is connected to the container to open the hopper, and thereby automatically feed food down into the tank, each time the container swings up. The closure has a metering opening which fills with food each time it is moved into opening alignment with the hopper opening, and drops the food into the tank as the closure is moved into its hopper closing position, to thereby deposit a measured quantity of food into the tank at a rate controlled by the rate of air bubble flow into the container.

6 Claims, 6 Drawing Figures

PATENTED APR 1 1975    3,874,340
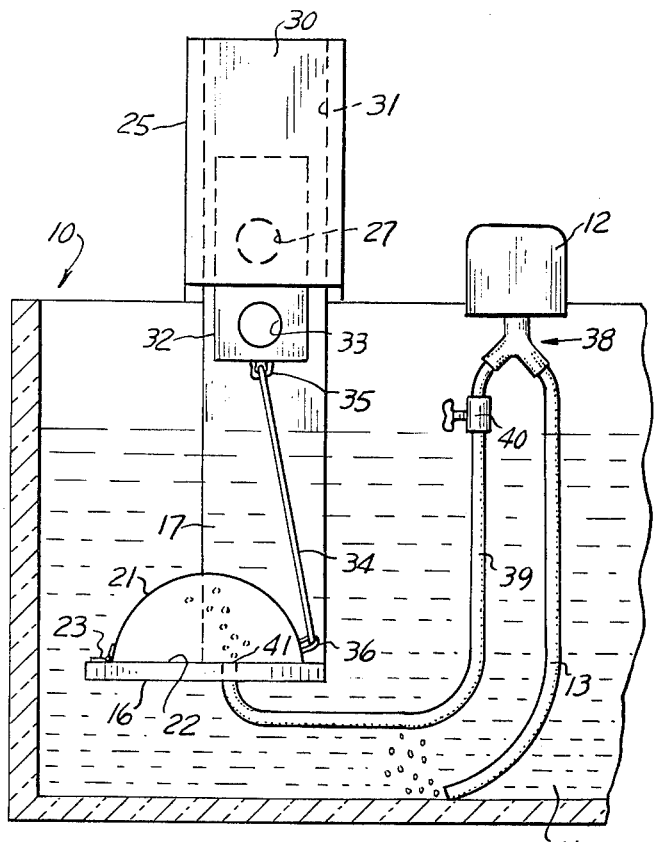
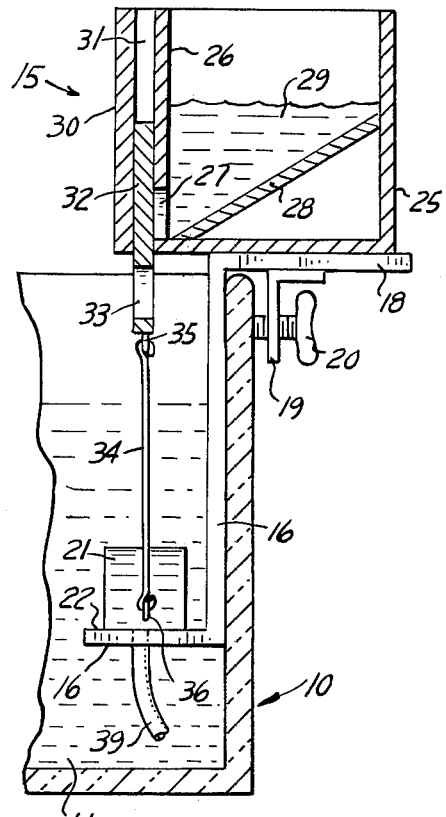
FIG. 1
FIG. 2
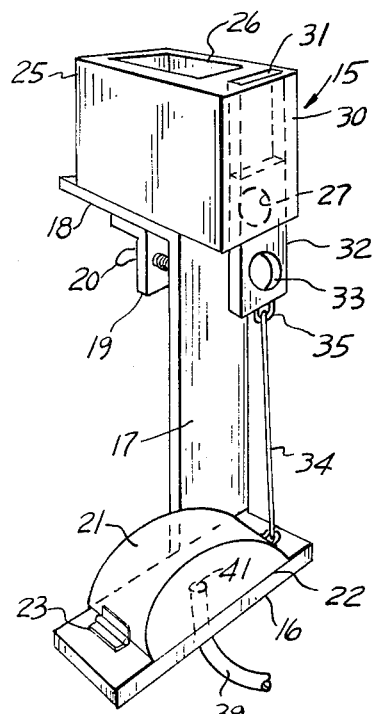
FIG. 3
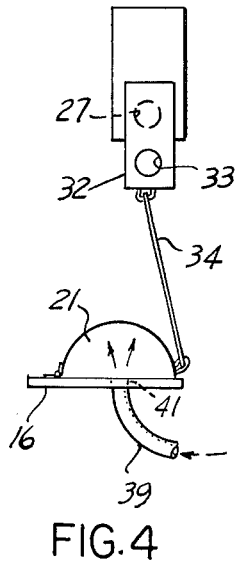
FIG. 4
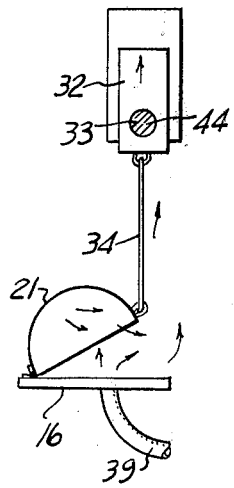
FIG. 5
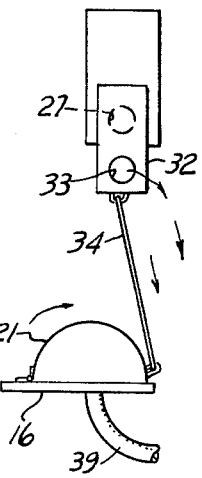
FIG. 6

AQUARIUM TANK FEED SYSTEM

BACKGROUND OF INVENTION

As is recognized, the fish contained within small size aquarium tanks use in homes and the like, should be fed prepared fish food on a regular basis. However, many home aquarium users frequently either forget to feed the fish on the required schedule, such as once a day or once every two or three days, and additionally, find it difficult to make arrangements to feed the fish during vacation times and other times when the users are not at home. Thus, efforts have been made in the past to provide some sort of suitable automatic systems for regularly depositing fish food in the aquarium tanks. Such type of devices usually depend upon a timing mechanism, such as an electrical or mechanical timer or the like to operate. These are relatively expensive devices and are not always reliable and frequently require maintenance.

Thus, the invention herein relates to an automatic system for feeding fish in an aquarium tank on a regular timed basis and with a metered amount of fish food, but utilizing a simplified mechanism which eliminates all conventional electrical or mechanical timing devices and instead is operated through the conventional aerating pump means utilized to bubble air into aquarium tank water.

SUMMARY OF INVENTION

The invention herein relates to a combined underwater actuating device coupled to an above water metering feed hopper for depositing a predetermined amount of fish food into an aquarium tank at predetermined times. The invention includes diverting, through a diversion tube, a portion of the air bubbles normally flowing into the aquarium tank through the conventional aerating pump, into a dome-like inverted container which is pivotally mounted upon a support within the tank. Thus, when sufficient air has built up in the container, it tilts or swings upwardly for a short time until the air escapes and is displaced by water, whereupon it swings downwardly back against the support.

The container is connected by a suitable link means to a slidable closure mounted upon the end of a feed hopper so that upon upward movement of the container, the closure slides upwardly to align a hopper feed hole with a hole in the closure for the passage of fish food therethrough. Thus, the hole in the closure is filled and when the closure lowers, as the container swings down upon loss of the accumulated air, a predetermined amount of fish food from the hole drops into the tank. By regulating the quantity of air diverted from the air pump means into the container, such as slowly bubbling air under the control of a valve in the diverstion tube, the container can be arranged to swing upwardly only at relatively long intervals, such as once a day or once every two or three days, etc. In this manner, the fish food can be regularly deposited within the aquarium tank on an automatic basis.

The system herein utilizes only a few simplified and inexpensive elements and thereby, is essentially foolproof and maintenance free as well as easily installed and used.

Further objects and advantages of this invention will become apparent upon reading the following description of which the attached drawings form a part.

DESCRIPTION OF DRAWINGS

FIG. 1 is a front elevational view of the feed system installed within a typical aquarium tank (shown in cross-section).

FIG. 2 is a side view, in partial cross-section, showing the system installed in the tank.

FIG. 3 is a perspective view of the feed system.

FIGS. 4, 5 and 6 schematically illustrate the steps in the operation of the system.

DETAILED DESCRIPTION

FIGS. 1 and 2 illustrate a typical aquarium tank 10 such as a large glass or glass and metal tank filled with water 11 as is commonly found in homes, offices and the like. Such tanks typically include a conventional aerating pump 12 mounted somewhere along the tank and having an aerating pipe 13 inserted into the tank for regularly bubbling the air through the tank water.

The automatic feed system 15 comprises a horizontal plate-like support 16 which may be formed on the lower end of a vertical strip 17 having an upper bent flange 18 which rests upon the top of the edge of the tank. This strip is secured to the tank wall in any suitable manner such as by an angle bracket 19 having one leg fastened, as by welding, to the flange 18 and the other leg extending downwardly parallel to the tank wall, and clamped thereto by means of a clamping screw 20.

The actuator is formed of a hollow, dome-like inverted container 21, which, in cross-section appears in the shape of a segment of a circle or a sphere, whose chord forms an open bottom edge 22 resting upon the upper surface of the support 16. A hinge 23 pivotally secures the container, at one side thereof, to the support so that the container may swing upwardly, about the hinge, from the support or swing downwardly back upon the support. The curvature of the container permits easy escape of air accumulated at its upper portion when the container is swung upwardly.

Mounted upon the flange 18 is a box-like feed hopper 25 having a forward inner wall 26 with a feed opening 27 and a sloped inner floor 28 upon which a collection of fish food 29 is placed. The fish food may be of the typical flaked or granulated type. Thus, the fish food tends to slide down the sloped floor 28 and out through the hopper feed opening 27.

The hopper also includes an outer front wall 30 which forms a slot 31 between the inner wall 26 and the outer wall. Within this slot is arranged a vertically slidable closure plate 32 whose lower end extends below the hopper and is provided with a hole 33. By sliding the closure upwardly, the hole 33 may align with the hole 27 so that fish food will accumulate within the hole 33 during that time.

The closure is connected by a suitable link 34 connected at one end to an eyelet 35 on the bottom of the closure and at its opposite end to an eyelet 36 on the container, for thereby tying the closure to the container. Thus, when the container swings up, the closure slides upwardly to align the hole 33 with the hopper hole 27.

The container is caused to swing up by means of air bubbles which accumulate within it. This is accomplished by first providing a T-connector 38 on the outlet of the already available pump 12 to divert some of the air bubbles through a diversion tube 39. The amount of diverted air is controlled by a conventional control valve 40 mounted on the diversion tube 39.

The opposite end of the diversion tube 39 is connected at 41 through the support 16 and opens into the container 21. Thus, a controlled flow of bubbles enters the container and accumulates therein during the time that the container is in the down position as illustrated in FIG. 1.

Referring to FIGS. 4–6, FIG. 4 illustrates the air (dotted arrows) bubbling into the container. The closure is in its closing position relative to the hopper feed hole 27. When sufficient air has accumulated within the container, such as over a 24 hour period, the container swings upwardly as shown in FIG. 5, and the link 34 pushes the closure upwardly to align its hole 33 with the hopper feed hole 27. Thus, fish food falls into the hole 33 and remains there, until the air escapes from the container and the container swings back down into the FIG. 6 position. At that point, the closure moves downwardly and the feed contained within its hole 33 is dumped into the tank. Thus, a measured amount, which in FIG. 5 is shown as a disk shaped collection of food 44 is deposited into the tank water.

Having fully described an operative embodiment of this invention, it is now claimed as follows:

1. An actuating device for actuating a mechanism associated with a water filled aquarium tank having an aerating pump means for normally pumping air bubbles into the tank water through a supply pipe, comprising:
   a plate-like support having an upper support surface and means for positioning the support within the tank, well beneath the surface of the water;
   a dome-like, inverted container having an open bottom defined by bottom edges which normally are rested upon the upper support surface;
   pivot means connecting said container along one edge thereof, to said support plate, so that the container may swing upwardly about the pivot means, away from the support surface and then downwardly back upon the support surface;
   an air diversion tube having an end formed for connection to the aerating pump means and having an air control valve means arranged within said tube, for diverting a controlled quantity of air bubbles away from the normal supply to the tank water and through the tube;
   the opposite end of said tube being connected to said support and opening beneath said container for feeding the diverted air bubbles into the container while the container is in its downward position, that is, rested upon the support;
   whereby after a predetermined time, related to the rate of feed of air bubbles diverted through the tube and into the container, the quantity of air collected within the container causes the container to swing into its upward position until the air escapes therefrom and is replaced by water, so that the container swings down again;
   and link means having a first end connected to the container and a second end connected to the mechanism to be actuated, said link for translating pivotal movement of the container into linear movement of the mechanism at the second end of the link for actuating said mechanism in response to the swinging of the container.

2. A construction as defined in claim 1, and said container being cross-sectionally shaped as a segment of a circle, whose chord forms the bottom so that the air accumulates at the upper center portion of the container and is displaced outwardly of said center portion when the container swings upwardly.

3. A construction as defined in claim 1, and said mechanism comprising a hopper arranged above the tank water level, for containing fish food, and said hopper having a feed opening normally closed by a vertically movable closure which is connected to the second end of said link means and operable to open when the container swings upwardly for thereby permitting the automatic discharge of said food through the hopper opening and into the tank.

4. A construction as defined in claim 3, and said closure being slidably movable transversely of the hopper opening and having a hole extending therethrough; with the hole being located to align with the hopper opening when the container is in its upward position, to thereby fill with fish food from the hopper, and to be offset relative to the hopper opening so as to close the hopper opening and simultaneously gravity drop the food accumulated within the hole into the tank for thereby depositing a measured amount of food into the tank each time the container swings upwardly and back downwardly.

5. An aquarium tank automatic feed system for use in a water filled tank having an aerating pump means for normally bubbling air into the water within the tank, comprising:
   an actuator formed of a rounded top, dome-like, open bottom container and a plate-like support upon whose upper surface the container is normally rested, and with hinge means pivotally connecting the container to the support wherein the container may swing, about the hinge, upwardly away from the support and back downwardly;
   an air division tube having an end adapted for connection to said aerating pump means, and an opposite end connected to the support beneath the container for diverting some of the air bubbles into the container, whereby upon accumulation of a sufficient quantity of air within the container, the container will swing upwardly;
   a feed hopper mounted above the tank water level and having a feed opening through which fish food may flow;
   a vertically movable closure normally covering said feed opening and a link means connecting the closure to the container so that upon upward swinging of the container, the closure is moved vertically to open the hopper feed opening for thereby depositing food into the tank.

6. A construction as defined in claim 5, and said closure being slidably movable transversely of the hopper opening, and having a hole extending therethrough; with the hole being located to align with the hopper opening when the container is in its upward position, to thereby fill with food from the hopper, and to be offset relative to the hopper opening so as to close the hopper opening and simultaneously gravity drop the food accumulated within the hole into the tank, for thereby depositing a measured amount of food into the tank each time the container swings upwardly and back downwardly.

* * * * *